Patented June 20, 1939

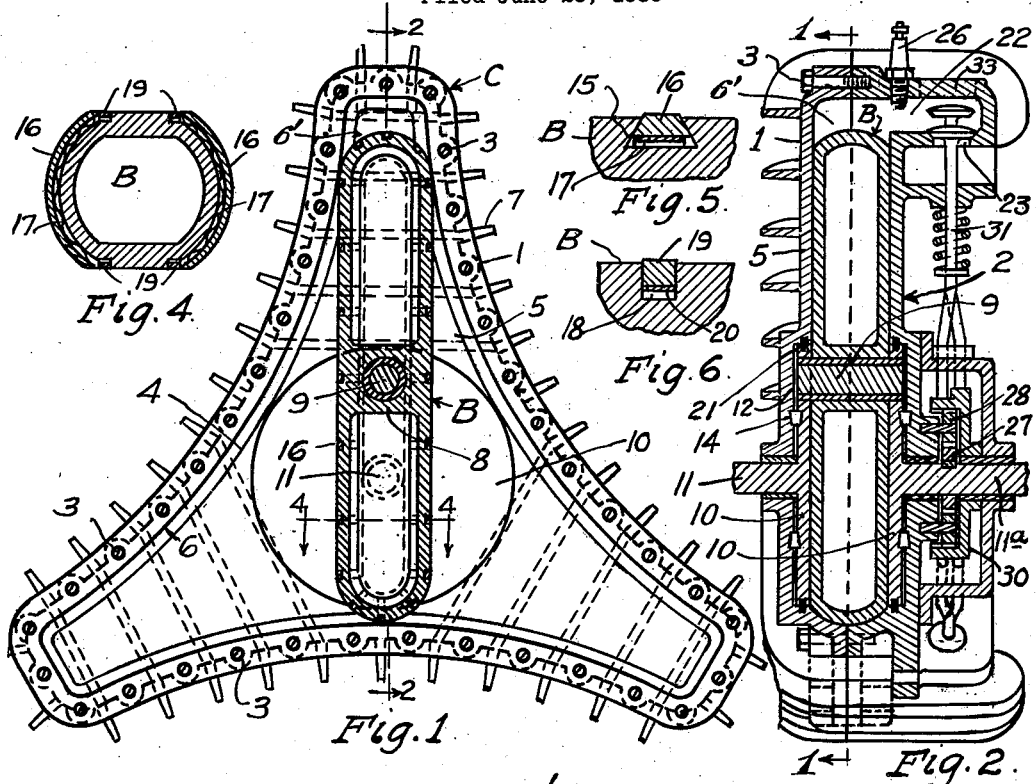
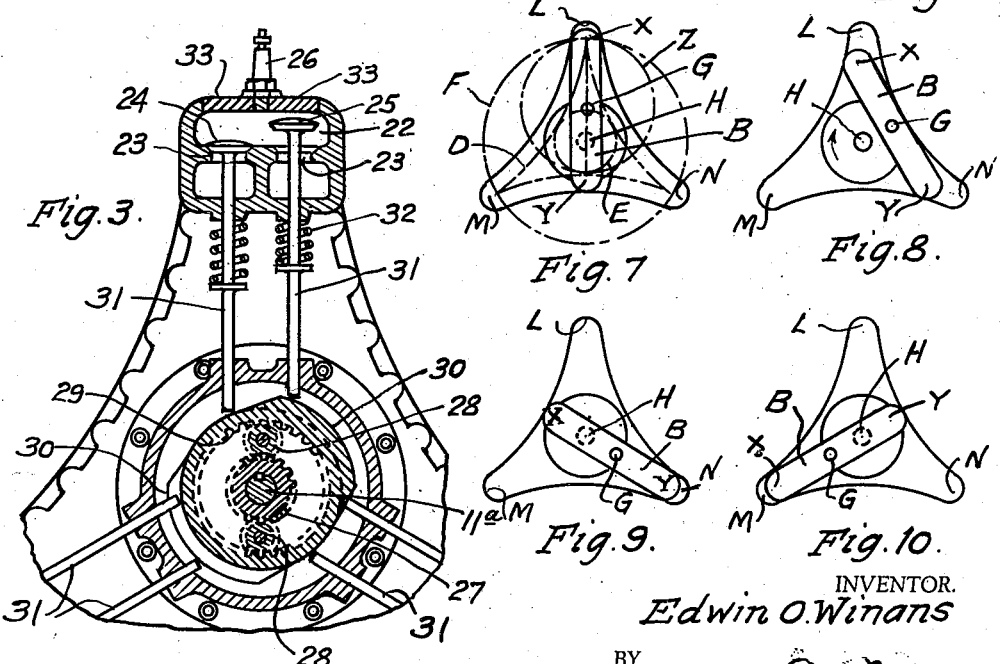

2,162,771

UNITED STATES PATENT OFFICE 2,162,771

MOTOR

Edwin O. Winans, Denver, Colo.

Application June 29, 1935, Serial No. 29,134

1 Claim. (Cl. 121—68)

This invention relates to motors and has relation more particularly to a power plant wherein a fluid or vapor under pressure is employed as the motive force, and it is primarily an object of the invention to provide a motor which is free of reciprocating motion and which is constructed and operated in a manner to substantially eliminate vibration.

It is also an object of the invention to provide a motor of this kind which requires but a small space in which to perform its duty in comparison with an engine of a cylinder and piston type and thereby providing a material saving in material with a corresponding reduction in weight.

The invention also has for an object to provide a motor of this kind of either an internal combustion type or of a steam or compressed air type which in its construction and operation is of a size and weight less per horse power output than a cylinder and piston type of motor of substantially the same output.

The invention consists in the details of construction and in the combination and arrangement of the several parts of my improved motor whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:

Figure 1 is a view partly in section and partly in elevation of a motor constructed in accordance with an embodiment of my invention, the section being on the line 1—1 of Figure 2;

Figure 2 is a sectional view taken substantially on the line 2—2 of Figure 1;

Figure 3 is a fragmentary view partly in section and partly in elevation illustrating in detail portions of the valve operating mechanism as herein embodied;

Figure 4 is a detailed sectional view on an enlarged scale taken through the rotating piston bar on substantially the line 4—4 of Figure 1;

Figure 5 is an enlarged fragmentary sectional view illustrating a compression seal for coaction with the curved edge faces of the casing;

Figure 6 is an enlarged fragmentary sectional view illustrating a compression seal for coaction with a side face and crank disk or plate;

Figures 7, 8, 9 and 10 are diagrammatic views showing consecutive positions of the piston bar with respect to the casing of the motor.

As disclosed in the accompanying drawing, C denotes the casing of my improved motor which is made in two sections divided along a line at right angles to the axis of the casing and which sections 1 and 2 are connected or held together in a conventional manner by the bolts 3. The assembled sections 1 and 2 provide an internal working chamber 4, the side walls 5 of which being substantially flat and in parallelism while the internal faces 6 of the edge walls are convex in cross section and arcuate from end to end with the outbow thereof disposed toward the axial center of the casing C.

The faces 6 are each disposed on the same radius and are equally spaced around the axial center of the casing with the outer ends of adjacent faces 6 spaced apart a distance substantially equal to the width of the rotating piston bar B at its extremities. In other words, it may be stated that the inner faces 6 are substantially hypocycloidal and in the present embodiment of the invention such faces are three in number. Projecting from the outer surfaces of the sections 1 and 2 are the cooling fins 7.

The piston bar B is in contact at all times at three points with the internal faces 6 during the cycles of operation of said bar so that there are always three distinct and separate chambers and when the motor is of an internal combustion type, as illustrated in the accompanying drawing, the intake, compression, explosion and exhaust take place in proper sequence in these chambers between the bar B and the faces 6. It may be added at this time that when the motive power is steam or compressed air the desired expansion and exhaust also take place in these chambers.

The bar B is hollow except at its central portion which is intersected by a block 8 providing a mounting through which is directed the crank pin 9. This pin 9 bridges the space between the disks 10, said pin 9 being eccentric to the shafts 11 and 11ᵃ. These shafts 11 and 11ᵃ carry the disks 10 which are concentrically arranged thereon. The shafts 11 and 11ᵃ are also in longitudinal alignment and extend outwardly through the side walls 5 of the casing C. These shafts 11 and 11ᵃ may be fixedly mounted should it be desired to have the casing C rotate, or the casing C may be mounted upon a suitable foundation should it be desired to have the shafts 11 and 11ᵃ rotate.

The disks 10 are snugly received within the inwardly opening circular pockets 12 provided in the opposed walls 5 of the casing, and interposed between the disks 10 and the base walls of said pockets 12 are the thrust bearings 14 to carry the pressure loads on the disks 10 or crank plates as they may be called, as well as any thrust load from a shaft 11 or 11a.

The surface portion of the piston bar coacting with the faces 6 is provided at points spaced therealong with the transversely disposed dovetail grooves 15 in which are arranged the compression segments or members 16 for coaction with the faces 6 to assure the desired compression seals. Interposed between each of the applied members or segments 16 and the base wall of the associated groove 15 is an expander spring 17 to assure the efficiency of the segment or member 16.

The extremities of the grooves 15 communicate with the continuous groove 18 in each side face of the bar B opposed to a disk or crank plate 10 and inlaid in each of said grooves 18 is a compression seal 19 for engagement with the inner side face of the casing and with a disk or plate, such contact being assured by an expander 20 interposed between the seal 19 and the base of the groove 18. The peripheral face or edge of each of the disks or crank plates 10 also carries a compression ring or seal 21.

As is clearly illustrated in Figures 1 and 2 of the drawing, the piston bar B is of a length less than the distance between the longitudinal center of an inwardly curved face 6 and the outer spaced extremities of adjacent faces 6 substantially in radial alignment with said longitudinal center. Each of the spaces formed between the outer extremities constitutes what may be termed a "cylinder 6'" and each of said spaces has in communication therewith through a side wall 5 of the section 2 of the casing C a chamber 22 with which communicates the inlet port 23 and the exhause port 23'. Each of the cylinders adjacent the said outer extremity thereof has the wall slightly constricted, as illustrated in Figure 1, whereby a reduction in diameter occurs. In the movement of the piston bar B the ends thereof successively approach these reduced areas and at each of these periods where an end of the piston bar is adjacent the reduced area, the engine structure is divided as shown into three distinct chambers. The fuel charge enters the small chambered areas into which the spark plugs project and these small chambered areas constitute the initial explosion chamber wherein the major portion of the power obtained for continuing the motion of the piston bar is developed. The inlet port 23 is in communication with a suitable source of fuel supply and said port 23 is under control of the valve 24 while the exhaust port 23' is under control of the valve 25. Also extending within the chamber 22 is a conventional spark plug 26, the operation of which occurring in a conventional manner in desired timed sequence. As the ignition system forms no part of the present invention a detailed disclosure and illustration thereof is not deemed necessary.

The valves 24 and 25 may be caused to operate as required in any desired manner but, as herein disclosed, one of the shafts 11a has mounted thereon for rotation therewith a timing drive gear 27 which meshes with the diametrically opposed pinions 28 rotatably carried by the adjacent side wall 5 of the section 2 of the casing C. These pinions 28 mesh with an internal gear 29 carried by the cam member 30 mounted for independent rotation upon the adjacent shaft 11a. This cam member 30 is so formed and caused to rotate at a speed to assure the desired operations of the valves 24 and 25 in accordance with a four cycle operation.

Should steam or compressed air be used as the motive force, the cam member 30 will be formed to cause the valves 24 and 25 to operate on a two stroke cycle. As this is believed to be obvious it is not thought necessary to illustrate this particular type of cam member as the differences are believed to be only that of design.

As is clearly illustrated in Figures 2 and 3, the valves 24 and 25 are provided with the stems 31 for direct coaction with the cam member 30 and that said valves are constantly urged toward their seats in a well known manner by the expansible members or coil springs 32. The outer wall of each of the cylinders as is particularly illustrated in Figures 2 and 3, is provided with removable plugs 33 to facilitate the application or removal of the valves 24 and 25.

In diagrammatic Figures 7 to 10 is illustrated the principle of operation of my improved motor. In these figures the end portions of the piston bar B are identified as X and Y and the spaces or cylinders between the bar B and the faces 6 of the casing are identified as L, M and N. With the bar B in the position as illustrated in Figure 7, M consitutes the intake, N the exhaust and L the explosion point with the piston bar center G or crank pin 9 rotating around the casing center H or shafts 11 and 11a in a clockwise direction. Figure 8 shows a progression in the rotation of the piston bar center G with the spaces L, M and N operating as set forth with respect to Figure 7. Figure 9 shows a further progression of the center G with L still in its explosion power stroke with N in its complete exhaust stroke and the intake stroke about to begin, and M well along in its compression stroke. Figure 10 shows explosion now at M, exhaust at L and intake at N. The cycles continue in this fashion, the explosions taking place in the order of L, M, N, L, M, N, etc.

Again referring to Figure 7, the line X—Y represents the diameter of the rolling circle Z which rolls around inside of circle F which is one and one-half times the diameter of the circle Z. The line X—Y then sweeps out the area enclosed within the curves D which are similar to the faces 6. The center G of line X—Y travels in a circular path E while the ends of the line X—Y trace out the hypocycloids D. The hypocycloids in the casing C are replaced by the curves or faces 6 a perpendicular distance from the hypocycloids of one-half the width of the bar B. The arcs of these curves are approximately arcs of circles whose centers are located twice the length of the line X—Y from the center H of the circle F.

From the foregoing description it is thought to be obvious that a motor constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

In an engine structure of the type described, a body having a flat chamber in the form of a hypocycloidal triangle having connecting walls of relatively narrow width between the side walls thereof, said narrow walls at the apices of the triangle being in spaced substantially parallel relation and joined by a short wall extending perpendicularly thereto, a piston consisting of a bar having parallel flat sides lying against said side walls and edge faces parallel throughout the length of the bar and conforming in transverse configuration to the contour of the inner faces of said connecting walls, the ends of said bar being semi-spherical continuations of the edge faces, a shaft disposed to rotate on an axis passing transversely through the center of said chamber, crank means between said shaft and the transverse center of said bar whereby rotation of the shaft will effect rotating sliding movement of the bar in the chamber about said transverse center, the end and edge faces of the bar being always in contact with the said connecting walls at the three sides of the triangle chamber whereby the one chamber is divided by the bar into three separate and unconnected power chambers, and the said bar being of such length and of such width between the edge faces that when disposed perpendicularly to the narrow wall forming a side of the triangle the end of the bar remote from said wall will fill the area in the opposite apex and terminate short of the wall extending across that apex, and valve controlled fluid inlet and outlet means communicating with the said power chambers.

EDWIN O. WINANS.